(12) United States Patent
Kasai

(10) Patent No.: US 7,768,163 B2
(45) Date of Patent: Aug. 3, 2010

(54) MOTOR

(75) Inventor: Shigeru Kasai, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 12/272,006

(22) Filed: Nov. 17, 2008

(65) Prior Publication Data

US 2009/0127955 A1    May 21, 2009

(30) Foreign Application Priority Data

Nov. 15, 2007    (JP) ............... 2007-296582

(51) Int. Cl.
*H02K 7/08* (2006.01)

(52) U.S. Cl. .............. 310/49.05; 310/90; 310/49.12; 384/420; 384/425

(58) Field of Classification Search .............. 310/49 R, 310/90, 49.01–49.55; 384/420, 425, 251
See application file for complete search history.

(56) References Cited

U.S. PATENT DOCUMENTS 6,873,068 B2 * 3/2005 Nishimura ............ 310/49.36

2006/0108885 A1 * 5/2006 Nishimura ............ 310/90
2006/0284496 A1 * 12/2006 Mizumaki ............ 310/49 R
2007/0085466 A1 * 4/2007 Shimomura et al. ........ 313/485
2007/0262660 A1 * 11/2007 Utsumi et al. ............ 310/49 R

FOREIGN PATENT DOCUMENTS

JP    2005-269733    9/2005

* cited by examiner

*Primary Examiner*—Quyen Leung
*Assistant Examiner*—Terrance Kenerly
(74) *Attorney, Agent, or Firm*—Cantor Colburn LLP

(57) ABSTRACT

A motor may include a rotor provided with a rotation shaft, a stator, a frame fixed to the stator and provided with a bearing part that rotatably supports an output side of the rotation shaft, and an urging member mounted on the bearing part for urging the rotation shaft. The bearing part may include a bearing, formed with a protruded part protruded from a flat plate part of the frame. The urging member may include a bottom face part provided with a spring part for urging the rotation shaft, a pair of side plate parts bent from side edge parts of the bottom face part, and a pair of hook parts bent on inner sides from the pair of side plate parts to be engaged with the protruded part. The urging member is mounted on the bearing part such that the hook parts are engaged with the protruded part.

9 Claims, 9 Drawing Sheets

MOTOR

CROSS REFERENCE TO RELATED APPLICATION

The present invention claims priority under 35 U.S.C. §119 to Japanese Application No. 2007-296582 filed Nov. 15, 2007 the entire contents of which are incorporated herein by reference.

FIELD OF THE INVENTION

At least an embodiment of the present invention may relate to a motor. More specifically, at least an embodiment of the present invention may relate to a motor which is provided with an urging member for urging a bearing that supports a rotation shaft of the motor in a rotation shaft direction.

BACKGROUND OF THE INVENTION

A rotation shaft of a motor which is supported by bearings is commonly structured such that its shaft end is urged in an axial direction by an urging member such as a plate spring. According to this structure, rattling, inclination or the like of the rotation shaft which is supported by the bearings are prevented.

Various mounting structures of the urging member have been proposed. For example, in Japanese Patent Laid-Open No. 2005-269733, a mounting structure of an urging member is described in which positional displacement or falling of the urging member which urges a rotation shaft (lead screw) in an axial direction can be prevented.

However, there are the following problems in the mounting structure described in the above-mentioned Patent Reference.

Firstly, in the structure described in the Patent Reference, in order to fix the urging member at a predetermined position, a tip end holding part for holding a tip end side of the rotation shaft is required to form a recessed part to which a pawl part formed in the urging member is fitted and thus machining on the tip end holding part is difficult. Especially, as the size of the motor becomes smaller, precise machining becomes more difficult and thus mounting accuracy of the urging member is deteriorated and manufacturing cost for the motor is increased.

Secondly, the urging member is arranged for urging an end part of the rotation shaft in the axial direction. In this case, as described above, when it is structured that the urging member is positioned with the tip end holding part (recessed part formed in the tip end holding part) as a reference, the urging position of the urging member may be displaced from the axial line of the rotation shaft due to dimensional errors of the part items. As a result, inclination of the urging direction to the rotation shaft and rattling of the rotation shaft due to pressurization shortage may occur and thus vibration or torque loss during driving of the motor may be larger.

SUMMARY OF THE INVENTION

In view of the problems described above, at least an embodiment of the present invention may advantageously provide a motor in which an urging member for urging a rotation shaft in an axial direction is capable of being mounted with a high degree of accuracy in a simple structure.

Thus, according to at least an embodiment of the present invention, there may be provided a motor including a rotor which is provided with a rotation shaft, a stator which is disposed on an outer peripheral side of the rotor, a frame which is fixed to the stator and is provided with a bearing part that rotatably supports an output side of the rotation shaft, and an urging member which is mounted on the bearing part for urging the rotation shaft to an opposite-to-output side in an axial direction. The bearing part includes a through-hole which is formed in a flat plate part formed on an output side of the frame, and a bearing for supporting the rotation shaft which is fitted into the through-hole and the bearing is formed with a protruded part which is protruded from the flat plate part in the axial direction. The urging member includes a bottom face part which is provided with a spring part for urging the rotation shaft, a pair of side plate parts which are bent from side edge parts of the bottom face part so as to face each other, and a pair of hook parts which are bent on inner sides from respective tip ends of a pair of the side plate parts to be engaged with an outer peripheral face of the protruded part. The urging member is mounted on the bearing part in a state that the hook parts are engaged with the protruded part.

According to a motor in accordance with at least an embodiment of the present invention, the urging member for urging the rotation shaft in the axial direction is fixed by means of that a pair of hook parts which are bent from the side plate parts are engaged with the protruded part which is protruded from the flat plate part of the frame for supporting the rotation shaft. In other words, only the protruded part is required to arrange in the flat plate part of the frame to mount the urging member. Therefore, machining for part becomes simple and, as a result, manufacturing cost for the motor can be reduced and mounting accuracy of the urging member can be improved.

Further, the urging member is mounted with the bearing which supports the rotation shaft as a reference. Therefore, a displacement amount of relative position of the urging member to the rotation shaft is reduced and the urging position of the urging member is prevented from largely shifting from the axial line of the rotation shaft. As a result, inclination of urging direction to the rotation shaft and rattling of the rotation shaft are restricted and thus vibration and torque loss during driving of the motor can be reduced.

In accordance with at least an embodiment of the present invention, the bearing includes a bearing hole through which a shaft end of the rotation shaft is passed and a flange part whose diameter is enlarged from the through-hole formed in the flat plate part in a radial direction. Further, the flange part is abutted with an end face on an output side of the flat plate part, and the bottom face part of the urging member is abutted with an end face of the flange part and the spring part of the urging member is abutted with the shaft end of the rotation shaft. According to the structure as described above, the flange part of the bearing is held between the urging member and the flat plate part and thus rattling of the bearing during driving of the motor can be prevented. Further, since the rotation shaft is directly urged by the spring part of the urging member, inclination of urging direction to the rotation shaft or rattling of the rotation shaft can be restricted.

Further, in accordance with at least an embodiment of the present invention, a pair of the hook parts is formed with a projecting part which functions as a locking part for the urging member, and the projecting part of the hook part is abutted with the protruded part of the bearing to restrict movement of the urging member. In addition, in accordance with at least an embodiment of the present invention, a pair of the hook parts is formed with a pair of curved parts abutting with an outer peripheral face of the protruded part, and the protruded part is pinched by a pair of the curved parts formed in a pair of the hook parts. Further, in accordance with at least an embodiment of the present invention, the projecting part is formed in each of a pair of the hook parts, and a pair of the curved parts structures a circular arc-shaped part formed between a plurality of the projecting parts. According to the structure as described above, the projecting part restricts movement of the urging member in a detaching direction and thus falling of the urging member which has been mounted can be prevented. Further, since the protruded part of the bearing is pinched by the curved parts and thus the urging member is held in a stable state.

In accordance with at least an embodiment of the present invention, a pair of the hook parts is bent at an acute angle to the bottom face part side from the side plate part to be abutted with an end face on an opposite-to-output side of the flat plate part, and the flange part of the bearing is pinched between the bottom face part of the urging member and the flat plate part. According to the structure as described above, since the flat plate part is pinched between the hook parts and the bottom face part in the state that the hook parts have acted as a plate spring, the urging member is firmly fixed. Further, since the flange part is formed in the bearing, the flange part is pinched between the hook parts and the bottom face part and thus rattling of the bearing can be also prevented.

Further, in accordance with at least an embodiment of the present invention, the urging member is formed with a stopper part which is bent from the bottom face part and which is abutted with the bearing part on a rear end side in a mounting direction of the urging member. According to this structure, efficiency of mounting work of the urging member is improved. Further, positional displacement of the urging member is prevented.

In addition, in accordance with at least an embodiment of the present invention, the spring part is formed so that its tip end is directed on a rear side in a mounting direction of the urging member. According to this structure, when the urging member is slid to be mounted, the tip end of the spring part which is cut and bent from the bottom face part is not caught by the bearing and the like and thus workability of mounting work of the urging member is improved.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1($a$) is a side view of the motor which is viewed from an output side, FIG. 1($b$) is a side view of the motor in its longitudinal direction, and FIG. 1($c$) is a top plan view of the motor.

FIG. 4($a$) is its top plan view, FIG. 4($b$) is a side view in its longitudinal direction, FIG. 4($c$) is its bottom view, and FIG. 4($d$) is a side view in its short side direction.

FIG. 8($a$) is a view showing a case where a hook part is bent at an acute angle from a side plate part to a bottom face part side, and FIG. 8($b$) is a view showing a case where the side plate part is also bent at an acute angle from the bottom face part to an inner side.

DETAILED DESCRIPTION OF THE PREFERRED EMBODIMENTS

A motor in accordance with an embodiment of the present invention will be described in detail below with reference to the accompanying drawings.

Figure 1A:
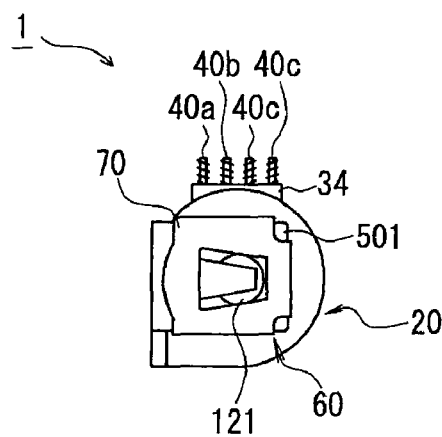
FIGS. 1($a$), 1($b$) and 1($c$) are explanatory views showing a structure of a motor in accordance with an embodiment of the present invention.
Figure 1B:
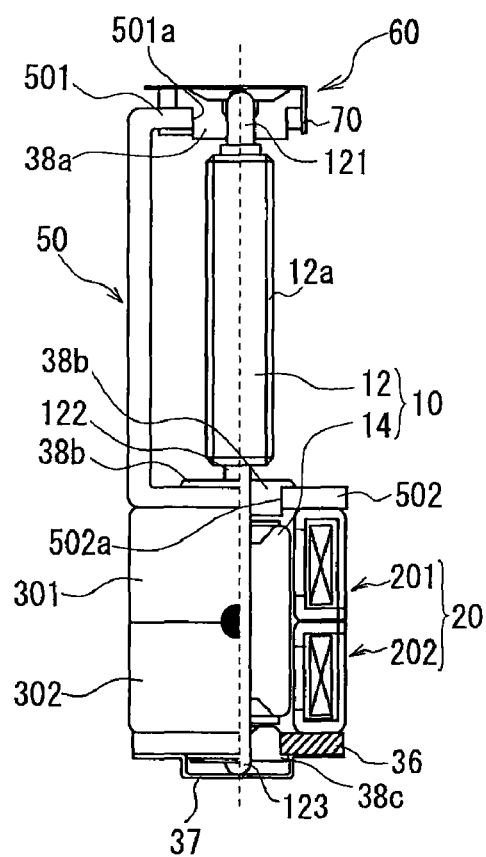
Figure 1C:
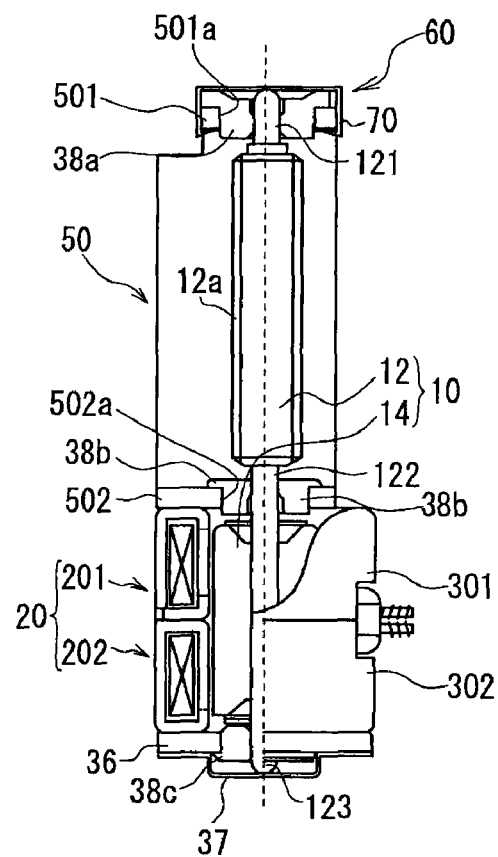
Figure 2:
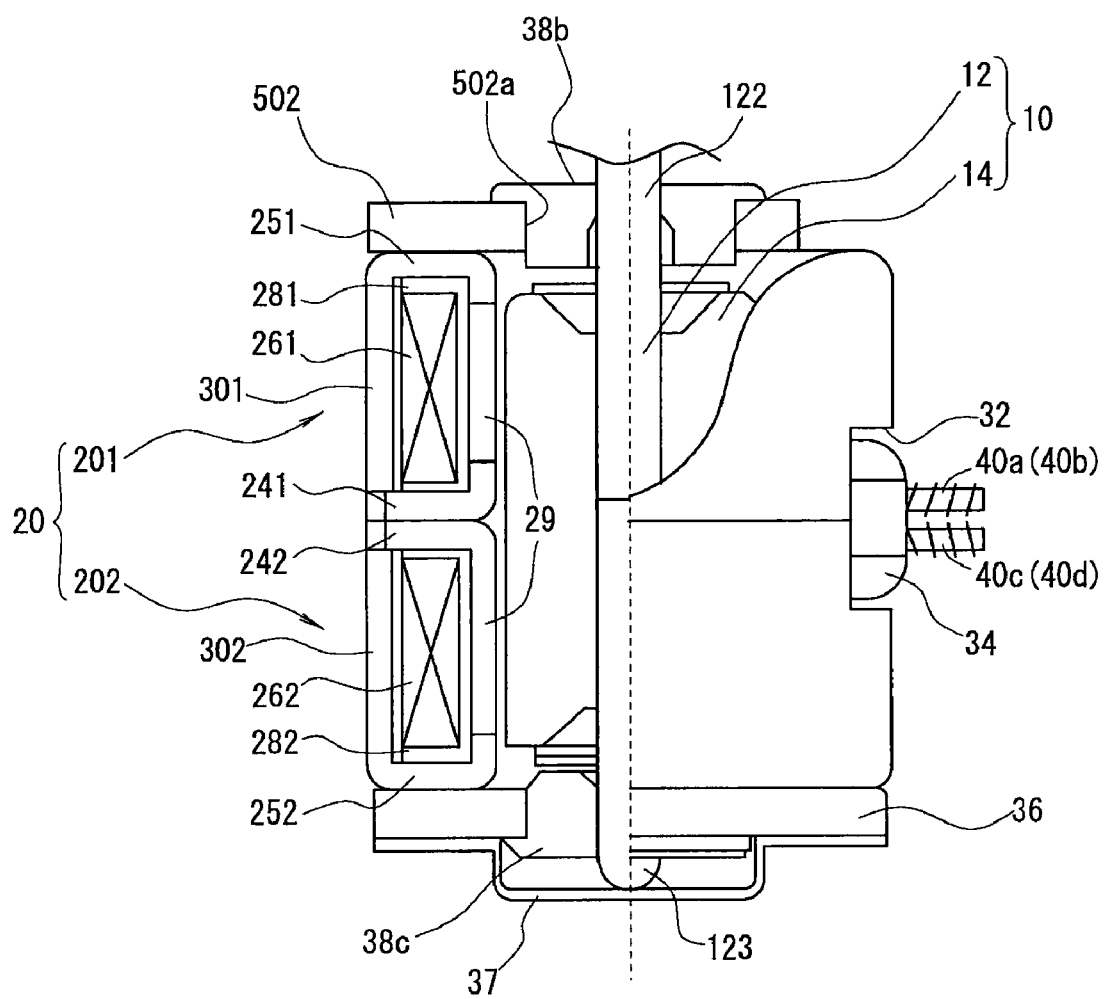
FIG. 2 is an enlarged view showing a rotor and a stator which are provided in the motor shown in FIGS. 1($a$) through 1($c$).

FIGS. 1($a$) through 1($c$) and FIG. 2 are explanatory views showing a structure of a motor 1 in accordance with an embodiment of the present invention. FIG. 1($a$) is a side view of the motor 1 in its short side direction which is viewed from an output side, FIG. 1($b$) is a side view (partly cross-sectional view) of the motor 1 in its longitudinal direction, and FIG. 1($c$) is a top plan view (partly cross-sectional view) of the motor 1. FIG. 2 is an enlarged view showing a rotor 10 and a stator 20 (main body of motor) shown in FIG. 1($c$).

The motor 1 in accordance with an embodiment of the present embodiment includes a rotor 10 provided with a rotation shaft 12, a stator 20 disposed on an outer peripheral side of the rotor 10, a frame 50 which is fixed to the stator 20 and formed in a U-shape in cross section, and an urging member 70 which is mounted on a bearing part 60 that is formed in a tip end of the frame 50.

The rotor 10 is structured of the rotation shaft 12 and a permanent magnet 14. Specifically, the permanent magnet 14 on which an "N"-pole and an "S"-pole are alternately magnetized in a circumferential direction is fixed on an outer peripheral face on an opposite-to-output side of the rotation shaft 12. The rotation shaft 12 is formed with a lead screw 12$a$ on an outer peripheral face on its output side (portion which is protruded from the stator 20) but the lead screw 12$a$ is not formed on an output side shaft end 121. An output side shaft end 121 of the rotation shaft 12 is supported by a first bearing 38$a$ (corresponded to a bearing in the present invention) which is supported in a tip end (flat plate part 501 described below) of the frame 50. A center support part 122 of the rotation shaft 12 is supported by a second bearing 38$b$ which is supported in a rear end (attaching part 502 described below) of the frame 50. The center support part 122 is a portion between a portion where the lead screw 12$a$ is formed and a portion where the permanent magnet 14 is fixed. In addition, an opposite-to-output side shaft end 123 is supported by a third bearing 38*c* which is fixed to a side plate 36 that is mounted on an opposite-to-output side of the stator 20.

The stator 20 is structured of a first stator assembly 201 and a second stator assembly 202 which are superposed on each other in an axial direction of the rotation shaft 12 and which are disposed on an outer peripheral side so as to face the permanent magnet 16.

As shown in FIG. 2, the first and the second stator assemblies 201 and 202 are structured of inner stator cores 241 and 242, coil bobbins 281 and 282 around which drive coils 261 and 262 are wound, and outer stator cores 251 and 252 which sandwich the coil bobbins 281 and 282 together with the inner stator cores 241 and 242.

A plurality of pole teeth 29 which are formed upright at equal intervals at an inner circumferential edge in an axial direction is formed in the respective inner stator cores 241 and 242 and the outer stator cores 251 and 252. A plurality of the pole teeth 29, which are respectively formed in the inner stator core 241 and the outer stator core 251, and in the inner stator core 242 and the outer stator core 252, are alternately and adjacently disposed to each other on the inner peripheral sides of the coil bobbins 281 and 282. Therefore, in this embodiment, the drive coil 261 is wound around the outer peripheries of the respective pole teeth 29 of the inner stator core 241 and the outer stator core 251 of the first stator assembly 201 in a circular ring shape through the coil bobbin 281. Similarly, the drive coil 262 is wound around the outer peripheries of the respective pole teeth 29 of the inner stator core 242 and the outer stator core 252 of the second stator assembly 202 in a circular ring shape through the coil bobbin 282.

Outer peripheral portions of the outer stator cores 251 and 252 are perpendicularly bent so as to cover the outer peripheries of the drive coils 261 and 262 so that they function as a motor case. The portions which cover the outer peripheries of the drive coils 261 and 262 are respectively referred to as a first motor case 301 and a second motor case 302. The first motor case 301 and the second motor case 302 are formed in a cylindrical shape by drawing working. Further, opening parts 32 which are cut in a predetermined size are formed in side wall faces of the first motor case 301 and the second motor case 302.

A terminal block 34 which is provided with terminal pins 40*a* through 40*d* for power supply is fixed at outer peripheral edges of the inner stator cores 241 and 242. The terminal block 34 is fixed to the outer peripheral edges of the inner stator cores 241 and 242 by insert-molding, press-fitting or the like. The terminal block 34 structured as described above is protruded from the opening part 32, which is formed in the side faces of the first motor case 301 and the second motor case 302. Coil ends of the drive coils 261 and 262 are connected to the terminal pins 40*a* through 40*d*.

A side plate 36 is fixed to an end face on the opposite-to-output side of the outer stator core 252. A third bearing 38*c* as a radial bearing for supporting the opposite-to-output side shaft end 123 of the rotation shaft 12 in the radial direction is mounted on the side plate 36 by press-fitting or the like. In addition, a cover member 37 is fixed to the side plate 36 by welding or the like so as to cover the third bearing 38*c*. The cover member 37 functions as a drop-off prevention member for the third bearing 38*c* and, in addition, functions as a member for supporting the opposite-to-output side shaft end 123 of the rotation shaft 12 in a thrust direction. In other words, the opposite-to-output side shaft end 123 of the rotation shaft 12 is rotatably supported so that its radial face is supported by the third bearing 38*c* and its thrust end face is supported by the cover member 37.

The frame 50 is a member which is structured so that both ends of a flat metal plate are bent at a substantially right angle to form in a U-shape. In this embodiment, a portion which is formed upright on the output side is referred to as a flat plate part 501 and a portion formed upright on the opposite-to-output side is referred to as an attaching part 502. The flat plate part 501 is formed with a first through-hole 501*a* and the attaching part 502 is formed with a second through-hole 502*a*. The first through-hole 501*a* and the second through-hole 502*a* are formed so that their centers are positioned on an axial line of the rotation shaft 12.

The frame 50 is fixed to the stator 20 by means of that the attaching part 502 is fixed to the outer stator core 251 by spot welding or the like. A second bearing 38*b* for supporting the center support part 122 of the rotation shaft 12 in the radial direction is fixed to the second through-hole 502*a* of the attaching part 502 by press-fitting or the like.

The first bearing 38*a* for supporting the output side shaft end 121 of the rotation shaft 12 is fixed to the first through-hole 501*a* of the flat plate part 501. In this embodiment, the first bearing 38*a* and the flat plate part 501 to which the first bearing 38*a* is fixed are referred to as a bearing part 60. The first bearing 38*a* is fixed to the bearing part 60, in other words, fixed to the first through-hole 501*a* of the flat plate part 501 by using an urging member 70 for urging the rotation shaft 12. Further, the urging member 70 is mounted on the flat plate part 501 of the frame 50.

Figure 3:
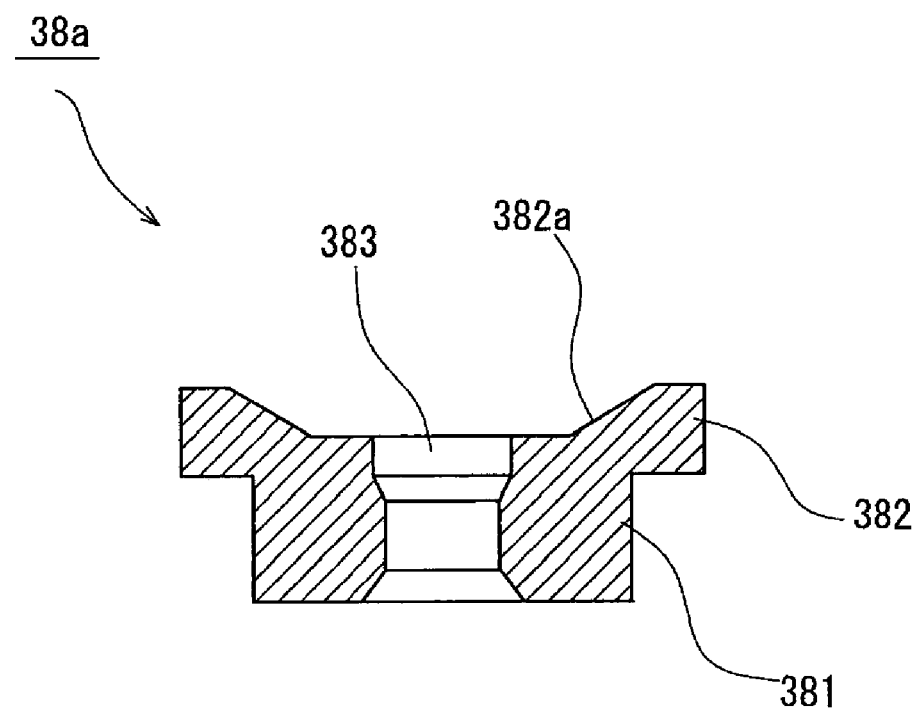
FIG. 3 is an enlarged cross-sectional view showing a first bearing which is provided in the motor shown in FIGS. 1($a$) through 1($c$).

Next, the structure of the bearing part 60 will be described below, FIG. 3 is an enlarged cross-sectional view showing the first bearing 38*a*. FIGS. 4(*a*) through 4(*d*) are outward appearance views showing the urging member 70, and FIG. 4(*a*) is its top plan view, FIG. 4(*b*) is a side view in its longitudinal direction, FIG. 4(*c*) is its bottom view, and FIG. 4(*d*) is a side view in its short side direction.

The first bearing 38*a* is a radial bearing made of resin or metal. The first bearing 38*a* is comprised of a main body part 381 (corresponding to a protruded part in the present invention) whose diameter (outer diameter) is set to be substantially the same as that of the first through-hole 501*a*, which is formed in the flat plate part 501 of the frame 50, and a flange part 382 whose diameter is larger than the main body part 381. The flange part 382 is formed with a recessed portion 382*a* having a tapered shape 382*b* in cross section which is inclined toward the main body part 381 side, i.e., toward the bearing hole 383 side. Further, a bearing hole 383 through which the output side shaft end 121 of the rotation shaft 12 is passed is formed at the center of the first bearing 38*a*, and an inner peripheral face of the bearing hole 383 rotatably supports the output side shaft end 121 of the rotation shaft 12 in the radial direction.

The urging member 70 is a press-worked product formed of a thin metal plate such as stainless steel which is elastically deformable so as to provide a spring property. As shown in FIGS. 4(*a*) through 4(*d*), the urging member 70 is structured of a bottom face part 72 provided with a spring part 721 which is cut in a tongue-like shape and is obliquely bent, a pair of side plate parts 741 and 742 which are bent from respective right and left side edges of the bottom face part 72 so as to face each other, a pair of hook parts 761 and 762 which are bent on inner sides from tip ends of the pair of the side plate parts 741 and 742, and a stopper part 78 which is bent from the bottom face part 72. Since the urging member 70 is structured to provide a spring property by utilizing a metal plate member, the pair of the side plate parts 741 and 742, the pair of the hook parts 761 and 762, and the like as well as the spring part 721 are respectively provided with a spring property.

The bottom face part 72 functions as a base portion of the urging member 70. A center portion of the bottom face part 72 is formed with the spring part 721 for urging the rotation shaft 12 to the opposite-to-output side. The spring part 721 is formed to be bent on the hook parts 761 and 762 side, i.e., on the opposite-to-output side in a state where the urging member 70 is mounted on the flat plate part 501 as shown in FIGS. 1(a) through 1(c) so that its tip end part 721a is located on a rear side with respect to a mounting direction (left direction in FIG. 4(a)) of the urging member 70 and a base end part 721b is located on a front side in its mounting direction.

The side plate parts 741 and 742 are bent portions which are bent at a substantially right angle from side edges of the bottom face part 72 so as to face and parallel to each other. A dimension between a pair of the side plate parts 741 and 742 is set to be equal to or a little larger than a width dimension of the flat plate part 501 of the frame 50.

Figure 4A:
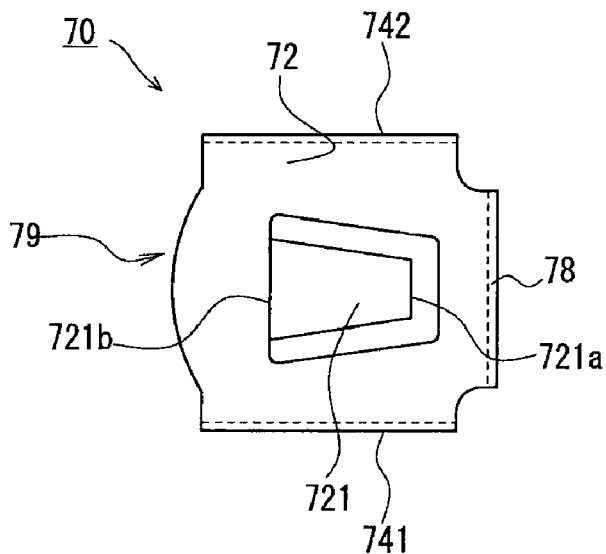
FIGS. 4($a$) through 4($d$) are explanatory views showing a structure of an urging member which is provided in the motor shown in FIGS. 1($a$) through 1($c$).
Figure 4D:
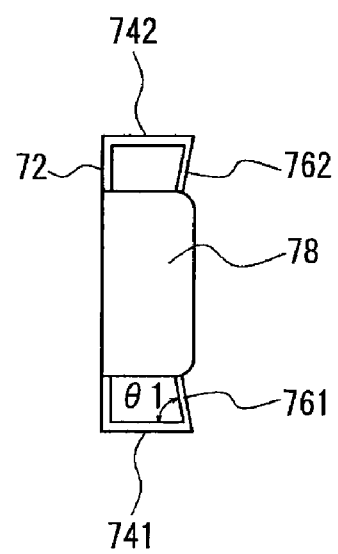
Figure 4B:
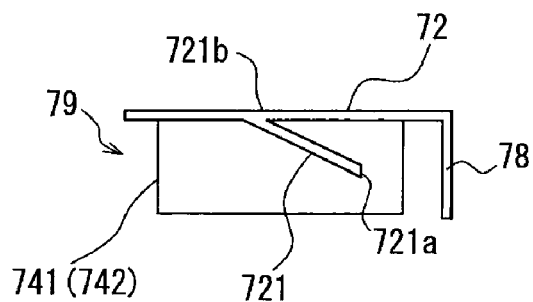
Figure 4C:
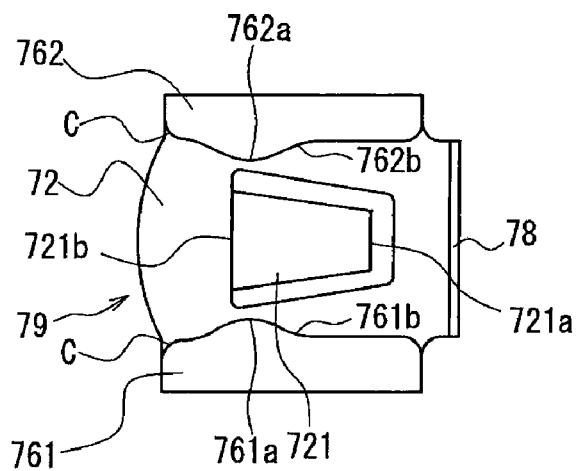

The hook parts 761 and 762 are bent portions which are bent inwardly from respective tip ends of the side plate parts 741 and 742. As shown in FIG. 4(c), end portions of the hook parts 761 and 762 are formed in a curved shape. Specifically, tip ends of the hook parts 761 and 762 located near the base end part 721b of the spring part 721 are formed with projecting parts 761a and 762a to reduce a distance between the hook parts 761 and 762. Further, tip ends of the hook parts 761 and 762 which are located on the stopper part 78 side from the projecting parts 761a and 762a are formed in a gradually inclined and curved shape from the projecting parts 761a and 762a to the stopper part 78 side. These portions are referred to as curved parts 761b and 762b. Further, tip ends of the hook parts 761 and 762 which are located on an open end 79 side from the protruded parts 761a and 762a are formed in tapered shapes which are inclined from the projecting parts 761a and 762a to the open end 79 side so that a distance between the tip ends of the hook parts 761 and 762 gradually becomes larger. Corner parts "C" of the hook parts 761 and 762 are respectively formed in an "R"-shape (round shape).

In this embodiment, a distance between the projecting parts 761a and 762a is set to be smaller than a diameter of the main body part 381 of the first bearing 38a. Therefore, in the state where the curved parts 761b and 762b are abutted with the main body part 381, the projecting parts 761a and 762a serve as a locking part, i.e., a coming-off-prevention part for the urging member 70. Further, the curved parts 761b and 762b are formed in a curved shape such that the main body part 381 is capable of being smoothly fitted between the curved parts 761b and 762b.

Further, the flat plate part 501 and the flange part 382 of the first bearing 38a are pinched by the hook parts 761 and 762 and the bottom plate part 72 as shown in FIG. 1(c). Therefore, as shown in FIG. 4(d), the hook parts 761 and 762 are bent a little larger than a right angle on the bottom face part 72 side from the side plate parts 741 and 742 so that the angle θ1 formed between the side plate parts 741 and 742 and the hook parts 761 and 762 is set to be an acute angle. Especially in this embodiment, a pair of the hook parts 761 and 762 is provided with a spring property. Therefore, the shapes of the hook parts 761 and 762 may not deform even when the pair of the hook parts 761 and 762 are formed at an acute angle, and the flat plate part 501 and the flange part 382 of the first bearing 38a are firmly pinched between the bottom plate part 72 and the pair of the hook parts 761 and 762.

The stopper part 78 is a bent portion which is bent at a substantially right angle from one side edge in a longitudinal direction of the bottom face part 72 (side edge on the tip end part 721a side of the spring part 721). In this embodiment, the other side edge of the bottom face part 72, which is referred to as an opened end 79, is largely opened as shown in FIG. 4(b). The stopper part 78 serves as a moving restriction part when the urging member 70 is mounted on the flat plate part 501 of the frame 50, in other words, when the urging member 70 is made slide in a direction perpendicular to the axial direction, i.e., in the radial direction. Further, the stopper part 78 functions as a positioning part for determining an urging position of the spring part 721.

Figure 5:
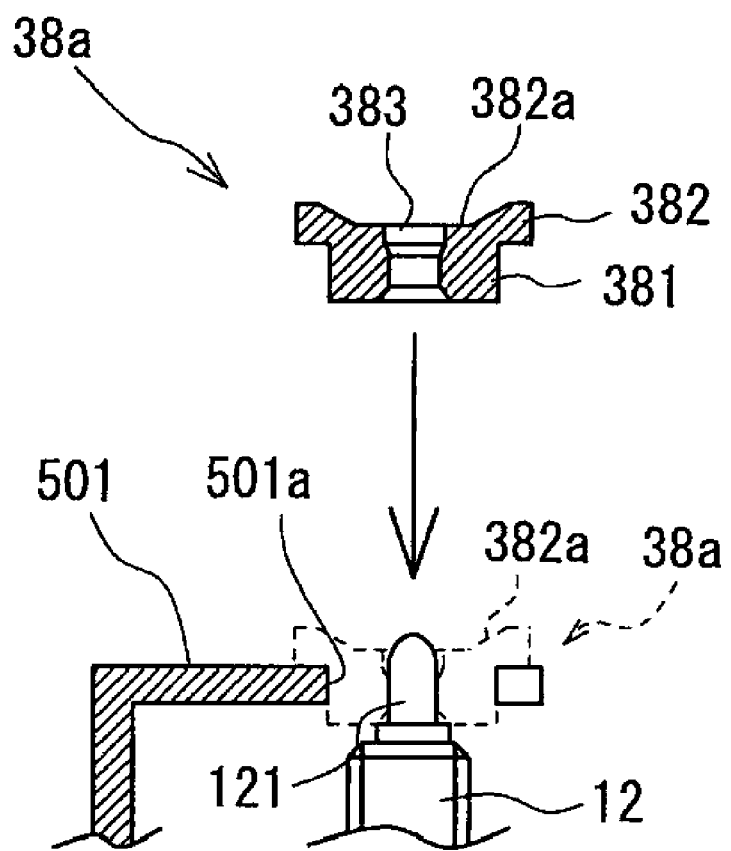
FIG. 5 is an explanatory cross-sectional view showing a step for mounting the first bearing shown in FIG. 3 on a frame (flat plate part).
Figure 6:
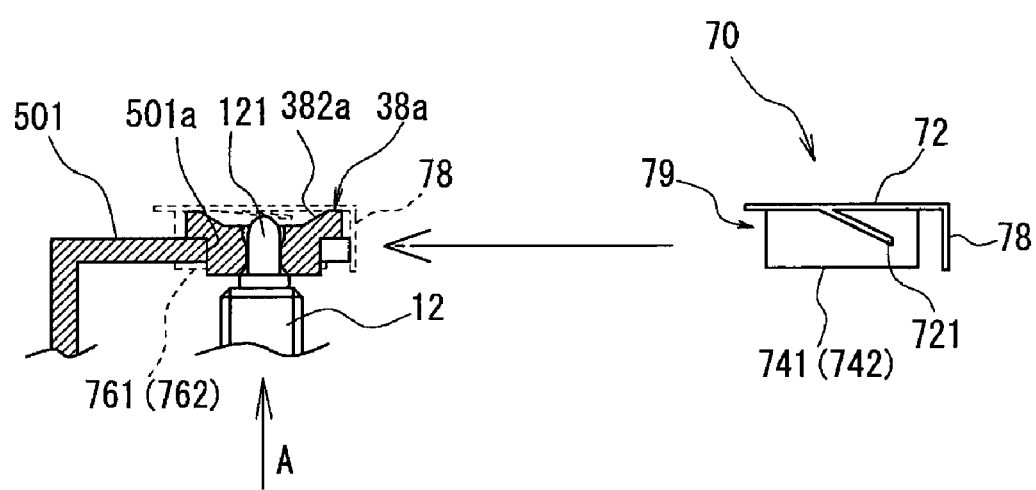
FIG. 6 is an explanatory cross-sectional view showing a step for mounting the urging member shown in FIGS. 4($a$) through 4($d$) on the frame (flat plate part).

In this embodiment, the rotation shaft 12 is urged to the opposite-to-output side from the output side and the first bearing 38a is mounted on the flat plate part 501 by the urging member 70 structured as described above. FIGS. 5 and 6 are explanatory views showing its mounting steps and its mounting structure.

First, as shown in FIG. 5, the main body part 381 of the first bearing 38a is inserted into the first through-hole 501a of the flat plate part 501 of the frame 50. Simultaneously, the output side shaft end 121 of the rotation shaft 12 is inserted into the bearing hole 383 of the first bearing 38a. As a result, the first bearing 38a is positioned by means of that the flange part 382 is abutted with the end face on the output side of the flat plate part 501 and the first bearing 38a is held in the first through-hole 501a in a state where a tip end portion of the main body part 381 is protruded on the opposite-to-output side of the flat plate part 501. In this case, as shown in FIG. 5, the output side shaft end 121 of the rotation shaft 12 does not protrude to the output side from the end face on the output side of the flange part 382, but the output side shaft end 121 is protruded from the bottom face of the recessed portion 382a, which is formed at the center portion of the flange part 382.

Next, as shown in FIG. 6, the urging member 70 is fitted to the flat plate part 501 from the open end 79 side. Specifically, the urging member 70 is fitted from the tip end side of the flat plate part 501 in a direction shown by the arrow, in other words, the urging member 70 is slid in the direction perpendicular to the rotation shaft 12 (radial direction). In this embodiment, the inner peripheral faces of the side plate parts 741 and 742 are slid to be held in the state where the inner peripheral faces of the side plate parts 741 and 742 are abutted with the side faces of the flat plate part 501 of the frame 50 (see FIGS. 8(a) and 8(b)). Further, the hook parts 761 and 762 are held so that their tip end parts are abutted with the outer periphery of the main body part 381 (protruded part) of the first bearing 38a and their inner faces are abutted with the end face on the opposite-to-output side of the flat plate part 501 (see FIGS. 8(a) and 8(b)). In this embodiment, as shown in FIG. 4(c), the corner parts "C" on the open end 79 side of the hook parts 761 and 762 are formed in the R-shape (round shape). Therefore, the corner parts "C" of the hook parts 761 and 762 can be prevented from being caught with the first bearing 38a and thus the urging member 70 can be smoothly advanced and fitted to the flat plate part 501.

Figure 7:
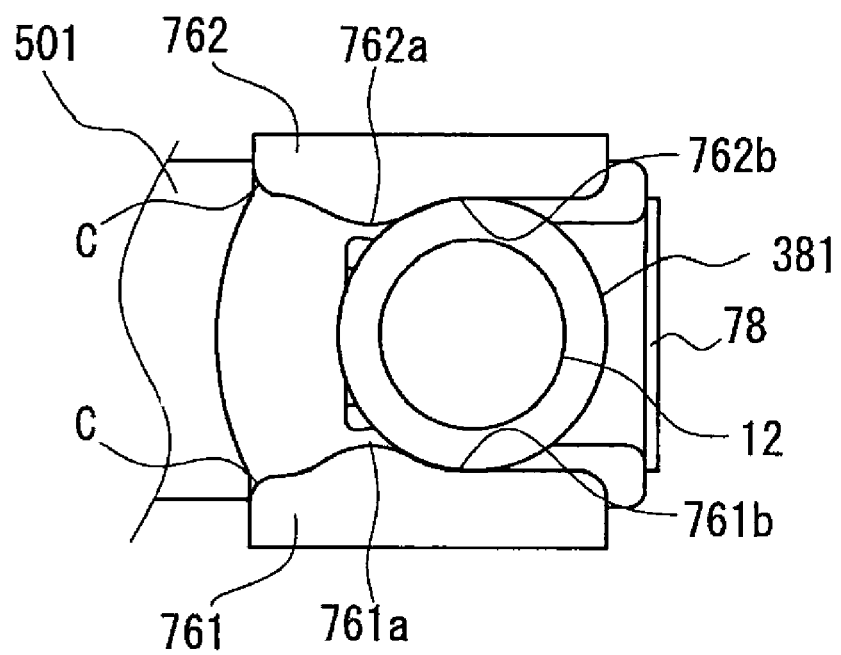
FIG. 7 is an enlarged side view (viewed in the direction shown by the arrow "A" in FIG. 6) in which the urging member is mounted on the frame in a state where a main body part of the first bearing is pinched by the hook parts (curved parts).

The urging member 70 is made slide to a position where the stopper part 78 is abutted with the tip end of the flat plate part 501. Then, as shown in FIG. 7 (viewed from the direction shown by the arrow "A" in FIG. 6), the side plate parts 741 and 742 having a spring property are elastically deformed and widened on outer sides and then, the protruded parts 761a and 762a are passed the cylindrical main body part 381 (protruded part) of the first bearing 38a which is protruded from the opposite-to-output side face of the flat plate part 501, and the main body part 381 is fitted between the curved parts 761b and 762b. In other words, the side plate parts 741 and 742 are provided with a spring property and thus, when the urging member 70 is slid to be mounted, the protruded parts 761a and 762a are widened on the outer sides at the time of abutting with the main body part 381 and then, the protruded parts 761a and 762a are returned when the main body part 381 is located between the curved parts 761b and 762b. Therefore, the urging member 70 is positioned at a predetermined position by means of that the curved parts 761b and 762b are abutted with the main body part 381 (protruded part) of the first bearing 38a as a reference. In other words, the urging member 70 is held in the state that the curved parts 761b and 762b which are formed at the tip ends of the hook parts 761 and 762 are abutted with the outer periphery of the main body part 381 (protruded part) of the first bearing 38a and movement in the direction opposite to the mounting direction, i.e., coming out of the urging member 70 is prevented by the projecting parts 761a and 762a. Therefore, the urging position of the spring part 721 of the urging member 70 to the rotation shaft 12 can be determined with a high degree of accuracy and thus satisfactory urging direction and urging force can be applied. In addition, in the state where the urging member 70 is mounted on the flat plate part 501, the protruded parts 761a and 762a function as a locking part which prevents the urging member 70 from coming off in the direction opposite to the slide direction. Therefore, according to the structure described above, the urging member 70 is hard to be come off in the direction opposite to the slide direction.

In this case, the spring part 721 is abutted with the output side shaft end 121 of the rotation shaft 12, which is protruded from the bottom face of the recessed portion 382a. Therefore, the rotation shaft 12 is directly urged in the opposite-to-output side direction from the output side by the spring part 721. In this manner, fixing of the first bearing 38a and mounting of the urging member 70 have finished.

In accordance with an embodiment of the present invention, the shape of the recessed portion 382a formed on the flange part 382 may be formed so that the spring part 721 is capable of being located in the recessed portion 382a to directly urge the rotation shaft 12. However, it is preferable that the shape of the recessed portion 382a is formed in a tapered shape in cross section like the embodiment described above. According to this structure, when the urging member 70 is to be mounted on the flat plate part 501, the spring part 721 is prevented from strongly abutting with the rotation shaft 12 just after its elastic deformation is released and thus the spring part 721 is prevented from being deformed.

As described above, according to the motor 1 in accordance with the embodiment described above, the urging member 70, i.e., the spring part 721 for urging the rotation shaft 12 in the opposite-to-output side is positioned at the predetermined position by means of that the curved parts 761b and 762b and the projecting parts 761a and 762a of the hook parts 761 and 762 are engaged with the main body part 381 of the first bearing 38a. In other words, different from a conventional motor in which the urging member is positioned and fixed with the frame 50 (flat plate part 501) as a reference, positional displacement of the relative position of the rotation shaft 12 and the urging member 70 hardly occurs and a pressurization position by the spring part 721 of the urging member 70 does not shift largely from the axial line of the rotation shaft 12. Accordingly, inclination of the urging direction to the rotation shaft 12 due to displacement from the center of the pressurization position can be restricted and occurrence of rattling of the rotation shaft 12 due to shortage of amount of pressurization can be restricted.

Further, the flat plate part 501 of the frame 50 on which the urging member 70 and the first bearing 38a are mounted is only required to form the first through-hole 501a in a roughly center portion. Therefore, manufacturing cost of the motor 1 (parts machining cost) can be reduced considerably.

Further, the rotation shaft 12 is urged to the opposite-to-output side by the spring part 721 of the urging member 70 which is abutted with the output side shaft end 121. In other words, the spring part 721 is capable of directly urging the rotation shaft 12 through the recessed portion 382a which is formed on the flange part 382 of the first bearing 38a. Therefore, inclination of the urging direction to the rotation shaft 12, rattling of the rotation shaft 12 or the like are restricted.

Figure 8A:
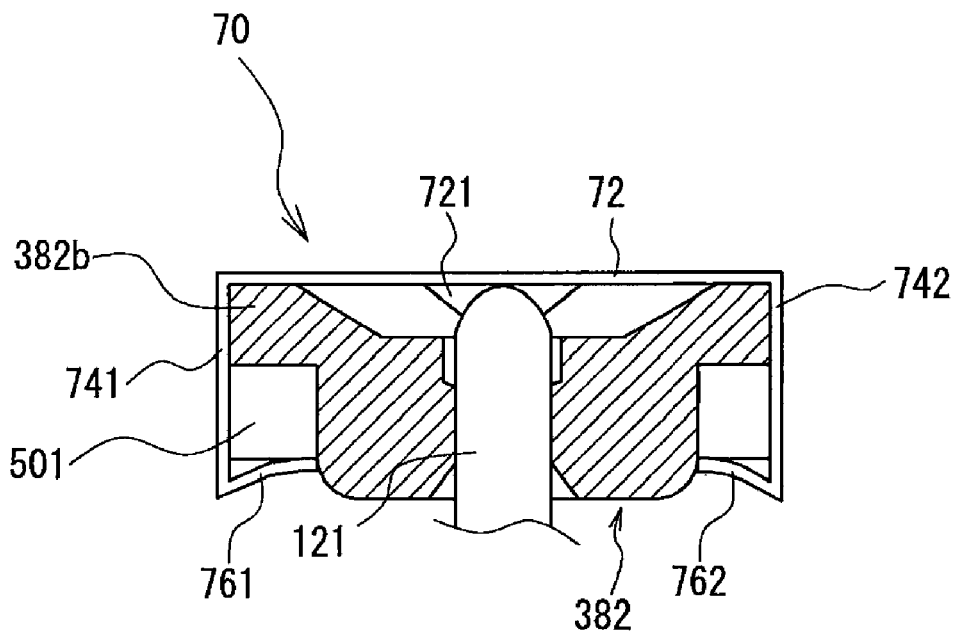
FIGS. 8($a$) and 8($b$) are explanatory enlarged cross-sectional views showing states where the urging member shown in FIGS. 4($a$) through 4($d$) is mounted on a frame (flat plate part).

Further, when the urging member 70 is slid to a predetermined position, the flange part 382 of the first bearing 38a and the flat plate part 501 are pinched between the bottom face part 72 and the hook parts 761 and 762 of the urging member 70. In this embodiment, as described above, the hook parts 761 and 762 are provided with a spring property and are formed to be bent from the side plate parts 741 and 742 to the bottom face part 72 side at an acute angle. Therefore, according to this embodiment, as shown in FIG. 8(a), which is an enlarged view showing the bearing part 60, the flat plate part 501 and the flange part 382 are pinched between the bottom face part 72 and the hook parts 761 and 762 in the state where the hook parts 761 and 762 have been acted as a plate spring. Therefore, the urging member 70 and the first bearing 38a are firmly fixed. As a result, according to the structure as described above, occurrence of falling, rattling or the like of the urging member 70 and the first bearing 38a can be restricted. Further, since the first bearing 38a is fixed to the flat plate part 501 of the frame 50 as described above, the first bearing 38a is not required to be press-fitted to the first through-hole 501a. In other words, especially, according to this embodiment, the shape of the bearing hole 383 of the first bearing 38a is not deformed by press fitting and thus the rotation shaft 12 can be supported with a high degree of accuracy.

Figure 8B:
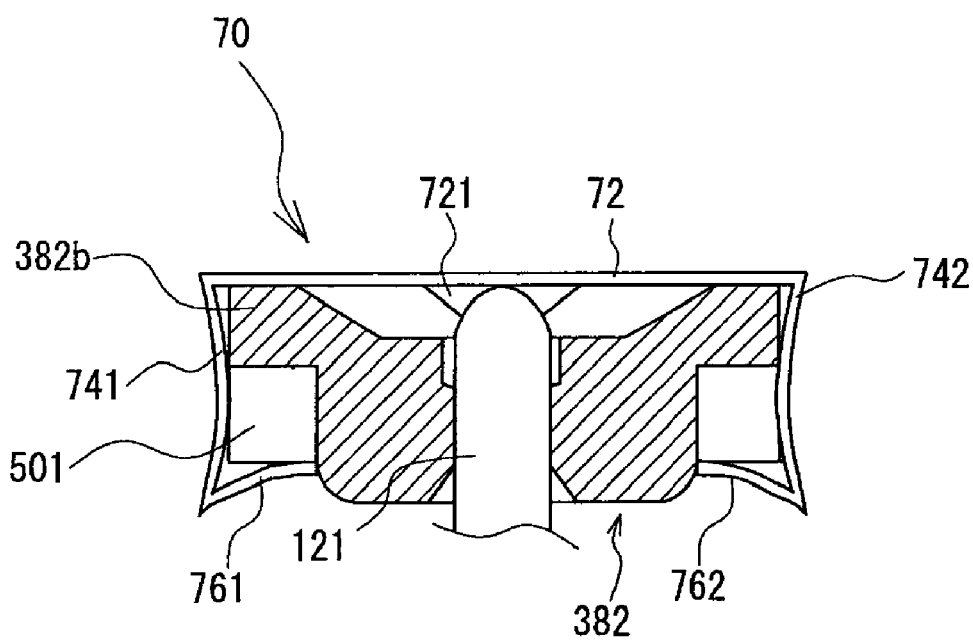

In accordance with an embodiment of the present invention, when the side plate parts 741 and 742 of the urging member 70 are formed to be bent at an acute angle on the inner sides from the bottom face part 72, the urging member 70 and the first bearing 38a are further firmly fixed. In other words, as shown in FIG. 8(b), the side plate parts 741 and 742 as well as the hook parts 761 and 762 act as a plate spring and, in this state, the flat plate part 501 and the flange part 382 are pinched between the bottom face part 72 and the hook parts 761 and 762. As a result, the urging member 70 and the first bearing 38a are further firmly fixed.

Further, in this embodiment, since the stopper part 78 is formed in the urging member 70, efficiency of assembling work which is a sliding and mounting work of the urging member 70 is improved. In other words, the stopper part 78 functions as a moving restriction part when the urging member 70 is slid to mount on the flat plate part 501 of the frame 50 and, in addition, the stopper part 78 also functions as a positioning part for determining an urging position of the spring part 721. Therefore, positioning accuracy of the urging member 70 is improved and mounting state of the urging member 70 can be stabilized. Further, in this embodiment, the urging member 70 is structured so that the urging member 70 is capable of sliding from the tip end of the flat plate part 501 to be mounted. Therefore, in comparison with a case, for example, when the urging member 70 is mounted in the axial direction of the rotation shaft 12, a problem in which a bending load is applied to the frame 50 (flat plate part 501) to deform the shape of the frame 50 is reduced.

Further, as described above, the spring part 721 is formed so that its tip end part 721a is located on the rear side in the mounting direction of the urging member 70 and its base end part 721*b* is located on the front side in the mounting direction. Therefore, when the urging member 70 is slid to be mounted, the tip end part 721*a* of the spring part 721 which is cut and bent from the bottom face part 72 is not caught by the first bearing 38*a* and thus workability of mounting work of the urging member 70 is satisfactory. Further, a problem is prevented in which the spring part 721 is caught by the first bearing 38*a* to be deformed and, as a result, pressurization to the rotation shaft 12 becomes insufficient.

In addition, the rotation shaft 12 is urged from the output side to the opposite-to-output side in the state where the output side shaft end 121, the center support part 122 and the opposite-to-output side support part 123 are respectively supported by the first bearing 38*a* through the third bearing 38*c*. In other words, the rotation shaft 12 is urged in the state that the rotation shaft 12 is supported at three points, i.e., the tip end and the rear end of the shaft and the portion between the tip end and the rear end. Therefore, inclination of the rotation shaft 12 due to urging of the spring part 721, rattling of the rotation shaft 12 during driving of the motor, or the like can be prevented.

Although the present invention has been shown and described with reference to specific embodiments, various changes and modifications will be apparent to those skilled in the art from the teachings herein.

Figure 9:
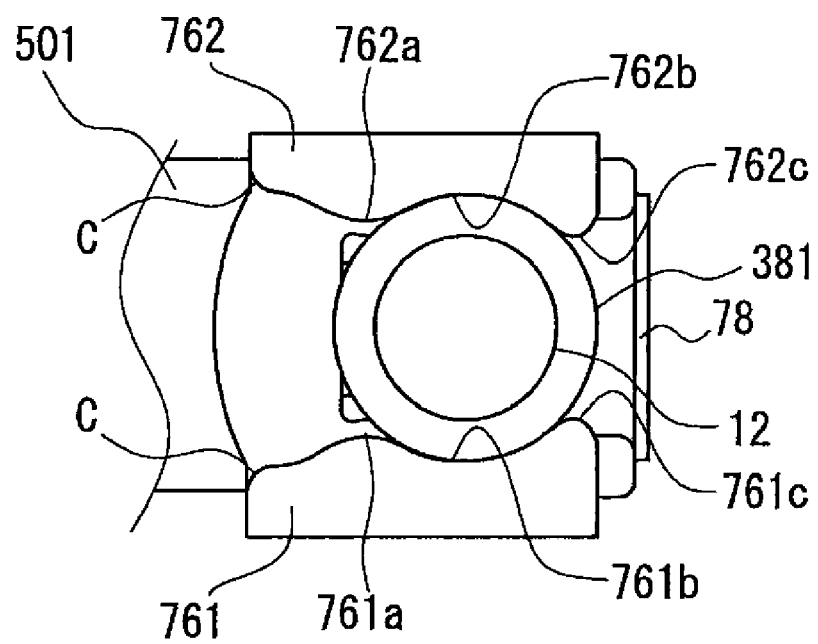
FIG. 9 is an enlarged side view (viewed in the direction shown by the arrow "A" in FIG. 6) in which an urging member in which second projecting parts are formed is mounted on a frame.

For example, as shown in FIG. 9, the hook parts 761 and 762 may be formed with second projecting parts 761*c* and 762*c* on the stopper part 78 side separately from the projecting parts 761*a* and 762*a*. According to this structure, the cylindrical main body part 381 of the first bearing 38*a* is supported to be pinched on the front and rear sides in the slide direction of the urging member 70. In other words, the cylindrical main body part 381 of the first bearing 38*a* is supported and pinched by the circular arc-shaped curved parts 761*b* and 762*b*, which are formed between the protruded parts 761*a* and 762*a* and the second protruded parts 761*c* and 762*c*. Therefore, falling, positional displacement and the like of the first bearing 38*a* and the urging member 70 due to impact are further surely prevented.

Further, in the embodiment described above, the main body part 381 of the first bearing 38*a* corresponds to the protruded part in the present invention. However, the protruded part in the present invention may be formed in a member which structures another bearing part 60. For example, the protruded part may be arranged in the flat plate part 501 of the frame 50.

In addition, in the embodiment described above, the urging member 70 is structured to urge the output side shaft end 121 of the rotation shaft 12 and to fix the first bearing 38*a* supporting the output side shaft end 121. However, similar structure may be applied to the opposite-to-output side shaft end 123. In this case, the present invention may be applied to a motor in which the frame 50 is not used and the output side shaft end is not supported by a bearing.

Further, in the embodiment described above, the frame 50 is fixed to the stator 20 by means of that the attaching part 502 is spot-welded to the outer stator core 251. However, the present invention is not limited to this embodiment and laser welding or an adhesive may be utilized. Further, both of an adhesive and welding may be utilized.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
a rotor which is provided with a rotation shaft;
a stator which is disposed on an outer peripheral side of the rotor;
a frame which is fixed to the stator and which is provided with a bearing part that rotatably supports an output side of the rotation shaft; and
an urging member which is mounted on the bearing part for urging the rotation shaft to an opposite-to-output side in an axial direction;
wherein the bearing part comprises:
a through-hole which is formed in a flat plate part formed on an output side of the frame; and
a bearing for supporting the rotation shaft, the bearing being fitted into the through-hole, and the bearing being formed with a protruded part that is protruded from the through-hole toward the opposite-to-output side in the axial direction;
wherein the urging member comprises:
a bottom face part which is provided with a spring part for urging the rotation shaft;
a pair of side plate parts which is bent from side edge parts of the bottom face part so as to face each other; and
a pair of hook parts which is bent on inner sides from respective tip end sides of the pair of the side plate parts and which is abutted and engaged with an outer peripheral face of the protruded part of the bearing; and
wherein the urging member is mounted on the bearing part in a state that the hook parts are abutted and engaged with the protruded part of the bearing so that the urging member is positioned with the protruded part of the bearing as a reference.

2. The motor according to claim 1, wherein
the bearing comprises:
a bearing hole through which a shaft end of the rotation shaft is passed; and
a flange part whose diameter is enlarged from the through-hole formed in the flat plate part in a radial direction; and
the flange part is abutted with an end face on an output side of the flat plate part, and
the bottom face part of the urging member is abutted with an end face of the flange part and the spring part of the urging member is abutted with the shaft end of the rotation shaft.

3. The motor according to claim 2, wherein
the pair of the hook parts is bent at an acute angle to a bottom face part side from the side plate part and is abutted with an end face on an opposite-to-output side of the flat plate part, and
the flange part of the bearing is pinched between the bottom face part of the urging member and the flat plate part.

4. The motor according to claim 1, wherein
the pair of the hook parts is formed with a projecting part which functions as a locking part for the urging member, and the projecting part of the hook part is abutted with the protruded part of the bearing to restrict movement of the urging member.

5. The motor according to claim 4, wherein
the protruded part of the bearing is formed in a cylindrical shape, and
the pair of the hook parts is formed with a pair of curved parts abutting with an outer peripheral face of the protruded part, and
the protruded part is pinched by the pair of the curved parts formed in the pair of the hook parts.

6. The motor according to claim 5, wherein
the projecting part is formed in each of the pair of the hook parts, and
the pair of the curved parts structures a circular arc-shaped part formed between a plurality of the projecting parts.

7. The motor according to claim 1, wherein
the protruded part of the bearing is formed in a cylindrical shape, and
the pair of the hook parts is formed with a pair of curved parts abutting with an outer peripheral face of the protruded part, and
the protruded part is pinched by the pair of the curved parts formed in the pair of the hook parts.

8. The motor according to claim 1, wherein
the urging member is formed with a stopper part which is bent in an axial direction from the bottom face part and which is abutted with the bearing part on a rear end side in a mounting direction of the urging member, and
the stopper part functions as a moving restriction part for restricting movement to the mounting direction of the urging member.

9. The motor according to claim 1, wherein
the spring part is formed so that its tip end is directed on a rear side in a mounting direction of the urging member.

* * * * *